United States Patent
Ponyavin et al.

(10) Patent No.: US 10,047,672 B2
(45) Date of Patent: Aug. 14, 2018

(54) GAS TURBINE WET COMPRESSION SYSTEM USING ELECTROHYDRODYNAMIC (EHD) ATOMIZATION

(75) Inventors: Valery Ivanovich Ponyavin, Greenville, SC (US); Gilbert Otto Kraemer, Greer, SC (US); Hua Zhang, Greer, SC (US); Jianmin Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 1079 days.

(21) Appl. No.: 13/607,849

(22) Filed: Sep. 10, 2012

(65) Prior Publication Data

US 2014/0069076 A1    Mar. 13, 2014

(51) Int. Cl.
*F02C 3/30*    (2006.01)
*F02C 7/143*    (2006.01)

(52) U.S. Cl.
CPC ............ *F02C 3/305* (2013.01); *F02C 7/1435* (2013.01)

(58) Field of Classification Search
CPC ........ F01K 21/047; F01K 23/06; F01C 1/356; F01C 11/004; F01D 1/34; F02C 3/30; F02C 3/305; F02C 7/055; F02C 7/1435; A61L 9/14; A61M 15/02; A61M 1/265; B05B 5/0255; B05B 5/032; B05B 5/03; B05B 5/0533; B05B 5/04; B05B 5/0535; Y02E 10/16
See application file for complete search history.

(56) References Cited

U.S. PATENT DOCUMENTS

| | | | | |
|---|---|---|---|---|
| 5,873,523 A | * | 2/1999 | Gomez | A61M 15/02 239/3 |
| 6,216,443 B1 | * | 4/2001 | Utamura | F01K 21/047 181/214 |
| 6,454,193 B1 | | 9/2002 | Busick et al. | |
| 6,595,208 B1 | * | 7/2003 | Coffee | B05B 5/002 128/200.14 |
| 6,886,345 B2 | * | 5/2005 | Ritland | F02C 7/1435 60/728 |
| 7,204,670 B1 | * | 4/2007 | Meher-Homji | F02C 7/04 415/1 |

(Continued)

OTHER PUBLICATIONS

Lastow et al., "Novel low voltage EHD spray nozzle for atomization of water in the cone jet mode", Journal of Electrostatics 65, 2007, Aug. 27, 2007, pp. 490-499.

*Primary Examiner* — Ehud Gartenberg
*Assistant Examiner* — Jason H Duger
(74) *Attorney, Agent, or Firm* — Ernest G. Cusick; Hoffman Warnick LLC

(57) ABSTRACT

A gas turbine wet compression system using electrohydrodynamic (EHD) atomization is disclosed. In one embodiment, the wet compression system includes: a gas turbine system including an air inlet duct, and a plurality of electrohydrodynamic (EHD) nozzles coupled to a water supply, the plurality of EHD nozzles configured to provide a water-spray for reducing a temperature of inlet air drawn into the air inlet duct. In another embodiment, a wet compression system for a gas turbine system includes: a plurality of electrohydrodynamic (EHD) nozzles, and a water supply in fluid communication with the plurality of EHD nozzles.

20 Claims, 6 Drawing Sheets

(56) References Cited

U.S. PATENT DOCUMENTS

| | | | | |
|---|---|---|---|---|
| 7,353,654 B2* | 4/2008 | Bolis | ............... | F01K 21/047 60/39.281 |
| 8,539,775 B1* | 9/2013 | Wong | ............... | F02C 7/30 60/39.092 |
| 2013/0247583 A1* | 9/2013 | Wong | ............... | F02C 7/30 60/782 |

* cited by examiner

GAS TURBINE WET COMPRESSION SYSTEM USING ELECTROHYDRODYNAMIC (EHD) ATOMIZATION

FIELD OF THE INVENTION

The subject matter disclosed herein relates to a gas turbine system. Specifically, the subject matter disclosed herein relates to a gas turbine inlet fogging system using electrohydrodynamic (EHD) atomization.

BACKGROUND OF THE INVENTION

High ambient temperatures negatively affect power output and the efficiency of gas turbine systems. More specifically, warm air drawn in by a gas turbine system has a lower air density when compared to the air density of cooler air. As a result, the warm air provides the gas turbine with a lowered air mass flow, which results in a loss in power output of the gas turbine system. In gas turbine systems, inlet fogging systems reduce the temperature of inlet air drawn into the compressor of the gas turbine system. The process of fogging reduces the temperature of the inlet air, which creates a higher air mass flow of the inlet air, and allows the compressor to compress the inlet air using a reduced work load per unit inlet air massflow. This reduced work load of the compressor provides the gas turbine system with higher power output.

Conventionally, inlet fogging systems require several hundred or thousands of fogging nozzles connected to high pressure pumps. The high pressure pumps provide demineralized water to the nozzles at pressures substantially higher than atmospheric pressure (e.g., 20 MPa). This is to ensure the conventional nozzles will produce water droplets small enough in diameter such that the water droplets in the "fogged" inlet air will evaporate before reaching the compressor or the droplets are so fine that they do not damage components in the passages. In the conventional inlet fogging systems the nozzles typically consist of a variety of high-pressure spray nozzles to produce water spray having a droplet size of about 20 micrometers. The high pressure forces the water bursting out of the conventional nozzle at a high exit velocity. As a result, the conventional nozzles are replaced annually under typical operation conditions due to excessive water abrasion to the nozzles. Additionally, conventional inlet fogging systems utilize a very low flow rate of the water through the conventional nozzles to also aid in producing a spray having a desired droplet size of about 20 micrometers.

However, if the supply pressure drops in providing the water to the conventional nozzles, the droplet size provided to the inlet air may vary and may have lognormal distribution with much larger droplets. As the water droplet size increases, it becomes more difficult for the water droplets to completely evaporate before reaching the compressor. If the water droplets do not completely evaporate, portions of the inlet duct, the compressor blades and compressor housing may become saturated. Overtime, the saturation of the inlet duct, compressor blades and compressor housing can lead to impingement damage erosion or other forms of material breakdown in these components. Once the material properties of the compressor have been compromised, the efficiency is reduced and replacement of damaged parts or the entire compressor is required. Although utilizing an inlet fogging system can improve the hot day turbine output degradation performance, conventional inlet fogging systems often require replacing materially compromised components of the gas turbine system as a result of less-than optimum operation of the conventional inlet fogging system.

BRIEF DESCRIPTION OF THE INVENTION

A gas turbine inlet fogging system using electrohydrodynamic (EHD) atomization is disclosed. In one embodiment, the inlet fogging system includes: a gas turbine system including an air inlet duct; and a plurality of electrohydrodynamic (EHD) nozzles coupled to a water supply, the plurality of EHD nozzles configured to provide a water-spray for reducing a temperature of inlet air drawn into the air inlet duct.

A first aspect of the invention includes an apparatus having: a gas turbine system including an air inlet duct; and a plurality of electrohydrodynamic (EHD) nozzles coupled to a water supply, the plurality of EHD nozzles configured to provide a water-spray for reducing a temperature of inlet air drawn into the air inlet duct.

A second aspect of the invention includes inlet fogging system for a gas turbine system. The inlet fogging system including: a plurality of electrohydrodynamic (EHD) nozzles; and a water supply in fluid communication with the plurality of EHD nozzles.

A third aspect of the invention includes a gas turbine system having: an air inlet duct configured to draw air into the gas turbine system; a compressor device positioned in series downstream from the air inlet duct; and an inlet fogging system operably connected to the gas turbine system, the inlet fogging system including: a plurality of electrohydrodynamic (EHD) nozzles; and a water supply in fluid communication with the each of the plurality of EHD nozzles.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
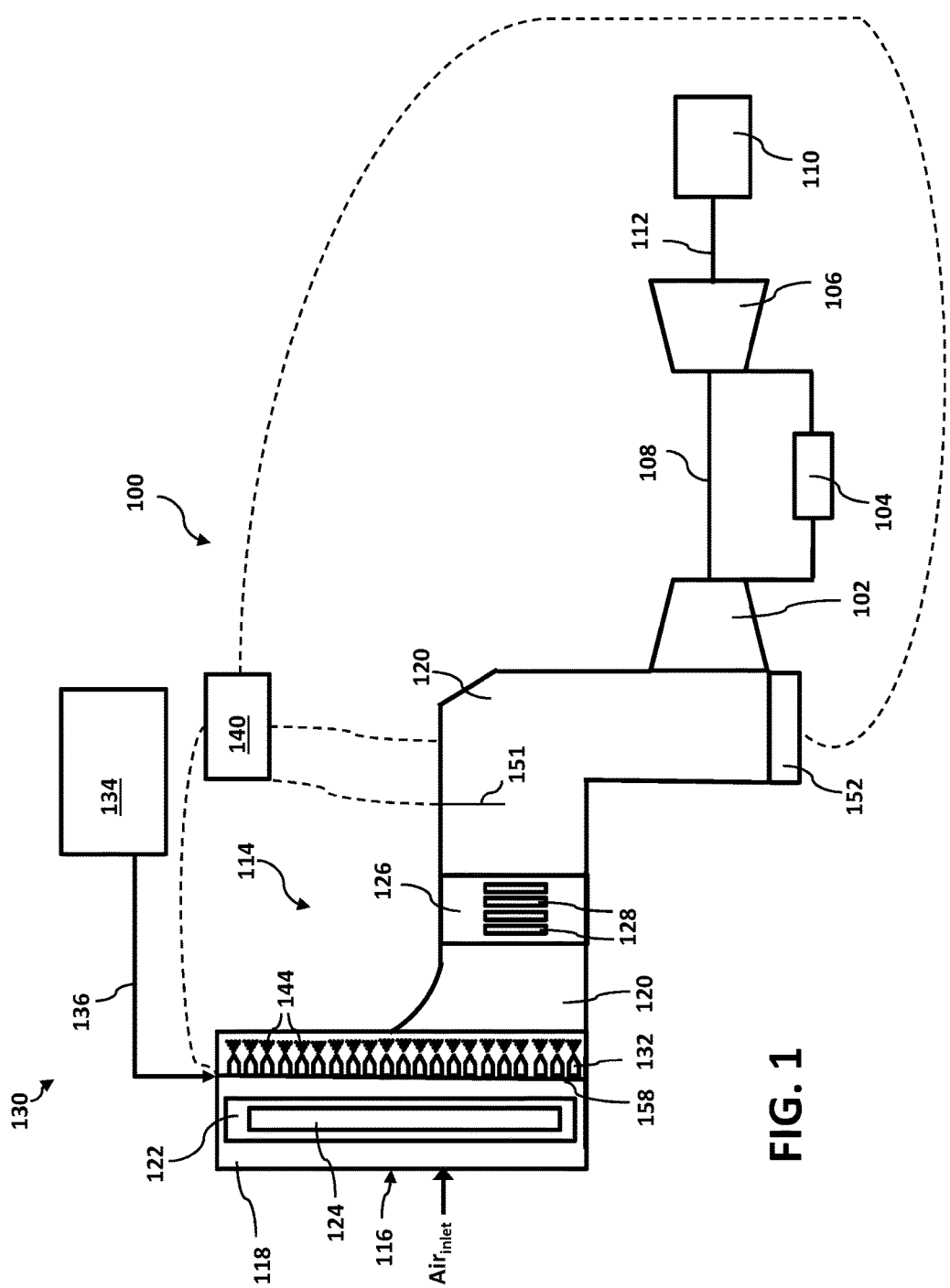
FIG. 1 shows a schematic depiction of a gas turbine system, including an inlet fogging system, according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As described herein, aspects of the invention relate to a gas turbine inlet fogging system. Specifically, as described herein, aspects of the invention relate to a gas turbine inlet fogging system having a plurality of electrohydrodynamic (EHD) nozzles positioned proximate an air inlet duct of the gas turbine system.

Turning to FIG. 1, a schematic depiction of a gas turbine system, including an inlet fogging system, according to embodiments of the invention is provided. Gas turbine system 100, may include a compressor device 102, a combustion chamber 104 configured to substantially combust compressed air supplied by compressor device 102, and a gas turbine 106 coupled to compressor device 102 via a shaft 108. Gas turbine 106 may further be coupled to a generator 110 via shaft 112. In the embodiment, gas turbine system 100 may be any conventional fuel-fired turbine system. Additionally, the respective components (e.g., compressor device 102, gas turbine 106, generator 110, etc.) of gas turbine system 100 may be configured as any conventional component included within a conventional gas turbine system. As such, basic functionality of the majority of the components may be omitted for clarity.

In an embodiment, as shown in FIG. 1, gas turbine system 100 may further include an air duct system 114 positioned in series, upstream of compressor device 102. Air duct system 114 may be configured to draw inlet air to compressor device 102 for use in gas turbine system 100. More specifically, air duct system 114 may be configured to draw air into an opening 116 of an air inlet duct 118 of air duct system 114. Air duct system 114 may provide the inlet air to compressor device 102 via a plurality of air ducts 120 of air duct system 114. Air ducts 120 may include any now known or later developed air duct configured to substantially deliver air to compressor device 102.

As shown in FIG. 1, a filter housing 122 may be positioned substantially within air inlet duct 118 of air duct system 114. Filter housing 122 may also include an air filter 124 positioned substantially adjacent opening 116 of air inlet duct 118. Air filter 124 may include any conventional air filter configured to filter out contaminates from inlet air used by gas turbine system 100. Further description of air filter 124 is omitted from the description for clarity. Air duct system 114 may also include a silencer housing 126 including a wall of silencer panels 128. Silencer housing 126 may be positioned in series, downstream of opening 116 of air inlet duct 118 and upstream of compressor device 102. Silencer panels 128 may be configured as any conventional silencer panels now known or later developed, which may be used in a gas turbine air inlet system. Further description of silencer panels 128 is omitted from the description for clarity.

In an example embodiment, as best shown in FIG. 1, gas turbine system 100 may also include an inlet fogging system 130 positioned proximate air duct system 114. As shown in FIG. 1, inlet fogging system 130 may include a plurality of electrohydrodynamic (EHD) nozzles 132 coupled to a water supply 134. More specifically, EHD nozzles 132 may be in fluid communication with water supply 134 via water lines 136. Note that some water lines 136 coupling EHD nozzles 132 to water supply 134 have been omitted for clarity. EHD nozzles 132 may be configured to provide a water-spray (FIG. 2), using the water from water supply 134, for reducing a temperature of inlet air drawn into air inlet duct 118 (as discussed below). Water supply 134 may provide water to EHD nozzles 132 using any now known or later developed water supply means, e.g., water pump, gravity feed, etc. Water supply 134 of inlet fogging system 130 may provide water to the plurality of EHD nozzles 132 at a pressure greater than atmospheric pressure. More specifically, and in contrast to conventional gas turbine fogging systems, water supply 134 may provide water to EHD nozzles 132 at a pressure slightly above atmospheric pressure, and may not be required to provide water to EHD nozzles 132 at pressure significantly higher than atmospheric pressure.

Figure 2:
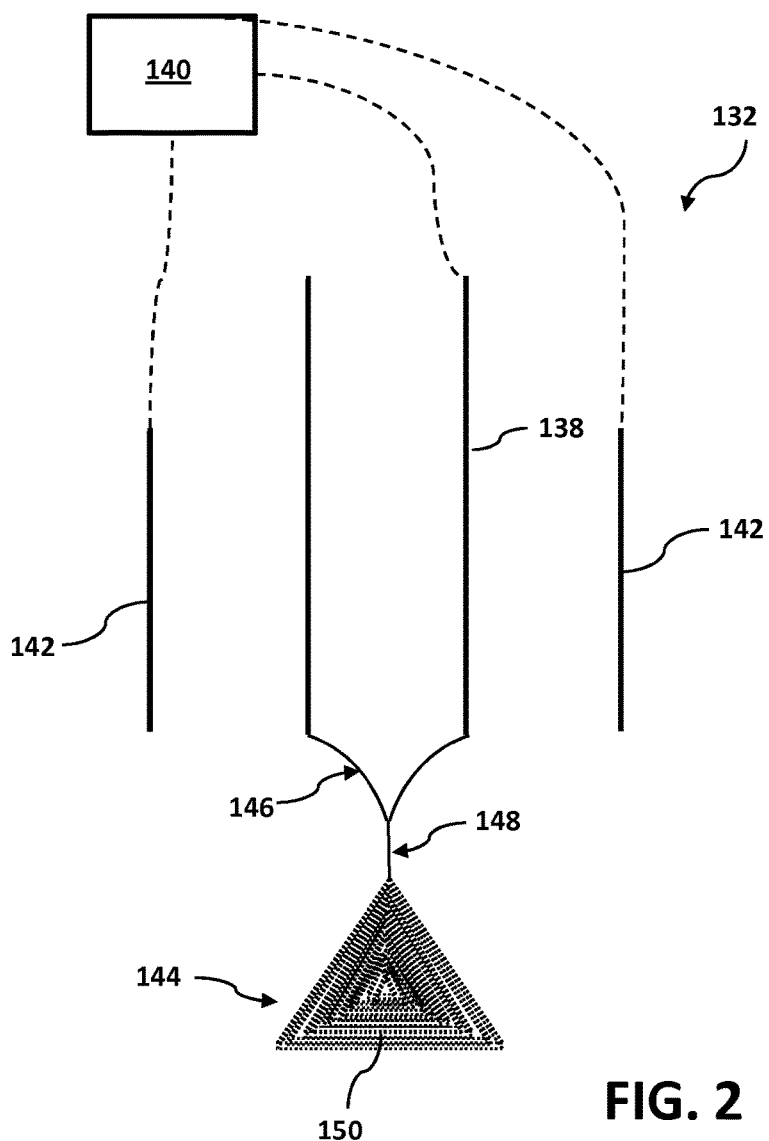
FIG. 2 shows a schematic depiction of a single electrohydrodynamic (EHD) nozzle of the inlet fogging system, according to embodiments of the invention.

FIG. 2, a schematic depiction of a single EHD nozzle 132 of inlet fogging system 130, according to embodiments of the invention is provided. In an embodiment, as best shown in FIG. 2, each EHD nozzle 132 may include a capillary tube 138 in fluid communication with water supply 134 (not shown). Capillary tube 138 may be manufactured from an electrically conductive material now known or later developed, e.g., copper, aluminum, metals, alloys, etc. As shown in FIG. 2, capillary tube 138 of EHD nozzle 132 may also be connected to an electric potential provided by a power source 140. Specifically, power source 140 is operably connected to capillary tube 138 of EHD nozzle 132 and power source 140 may be configured to provide a first voltage to the capillary tube 138 to provide an electric potential. In an embodiment, power source 140 may be configured as a computer system operably connected to high voltage converters for supplying voltage to capillary tube 138 of EHD nozzle 132. In another embodiment, power source 140 may be any conventional power source or voltage supply means for providing capillary tube 138 of EHD nozzle 132 with a voltage in a range of about 5 kV to 20 kV.

EHD nozzle 132 may also include a counter-electric potential structure 142 positioned substantially adjacent capillary tube 138. In an embodiment, as best shown in FIG. 2, counter-electric potential structure 142 may be connected to a counter-electric potential provided by power source 140. Similar to capillary tube 138, power source 140 may also be operably connected to counter-electric potential structure 142, and may be configured to provide a second voltage, distinct from the first voltage, to counter-electric potential structure 142. As shown in FIG. 2 counter-electric potential structure 142 may be configured as a plurality of plates, manufactured from an electrically conductive material, which may be positioned substantially adjacent capillary tube 138. In an alternative embodiment, counter-electric potential structure 142 may be configured as an electrically conductive tube, positioned concentrically around capillary tube 138.

In providing distinct voltages to capillary tube 138 and counter-electric potential structure 142, respectively, the water in capillary tube 138 of EHD nozzle 132 is provided with a charge results in atomization of the water as it exits capillary tube 138. More specifically, electrohydrodynamic atomization of the charged water exiting the capillary tube 138 may occur as a result of power source 140 providing an electric potential to capillary tube 138 and a counter-electric potential to counter-electric potential structure 142. As a result of the electrohydrodynamic atomization of the charged water exiting the capillary tube 138, water-spray 144 may be formed by the charged water. Water-spray 144 may be dispensed into the inlet air drawn in by the air inlet duct 118 to reduce the temperature of the inlet air before the inlet air reaches compressor device 102. As discussed above, reducing the temperature of inlet air before compression by compressor device 102 may provide higher air mass flow, which may result in power augmentation for gas turbine system 100.

In an embodiment, as shown in FIG. 2, the electrohydrodynamic atomization of the charged water may create a Taylor-cone effect on the water dispensed from capillary tube 138 of EHD nozzle 132. More specifically, as the water leaves capillary tube 138 a Taylor-cone 146 may be formed as a result of the electric charge on the water from the electric potential and counter-electric potential placed on capillary tube 138 and counter-electric potential structure 142. Additionally, Taylor-cone 146 may be formed as a result of the electrically-charged water's surface tension as it leaves capillary tube 138. As shown in FIG. 2, at the tip or apex of Taylor-cone 146 the charge on the water may overcome the surface tension of the water, which may result in a thin jet 148 of the water being dispensed from capillary tube 138. Finally, as shown in FIG. 2, shortly after thin jet 148 of charged water is formed, the charged water is "atomized," or converted to small droplets of water, to form water-spray 144. More specifically, water-spray 144 may be formed as a result of the charged water particles rapidly dispersing from the formed thin jet 148 due, at least in part, to the overcome surface tension of the water and the charge placed on the water.

Water-spray 144 may include a plurality of water droplets 150 which may be dispensed within air duct system 114. More specifically, water droplets 150 may be provided to reduce the temperature of the inlet air drawn in by air inlet duct 118 of air duct system 114 before the inlet air may be compressed by compressor device 102. In an embodiment, as shown in FIG. 2, water droplets 150 of water-spray 144 may include a typical SMD (Sauter Mean Diameter) in a range of about 1 to 5 micrometer, compared to prior art, which may produce water droplets having a SMD of about 20 micrometers and higher. More specifically, water droplets 150 formed by EHD nozzle 132 using the electrohydrodynamic atomization process discussed above, may include a SMD of about 1 micrometer. As a result of the water droplets 150 including a SMD in a range of about 1 to 5 micrometer, water droplets 150 may be evaporated by the inlet air drawn into air duct system 114 using air inlet duct 118 more quickly. The quick evaporation of water droplets 150 may cause a more rapid reduction in the temperature of the inlet air drawn in by air inlet duct 118. Furthermore, the size of water droplets 150 and the charge placed on water-spray 144 may result in less coalesced water particles reaching compressor device 102 during the inlet fogging process of gas turbine system 100. Additionally, water droplets 150 including a SMD in a range of about 1 to 5 micrometer may not have such a negative effect (e.g., rust, mechanical breakdown, decreased efficiency, etc.) on compressor device 102 if water droplets 150 are not completely evaporated in the inlet air before reaching compressor device 102.

In utilizing electrohydrodynamic atomization of the water, inlet fogging system 130 may include a reduced number of EHD nozzles 132 in comparison to the number of required conventional spray nozzles in conventional inlet fogging systems. Inlet fogging system 130 may utilize a range of about 60 to 150 EHD nozzles 132, compared to prior art, which includes a range of about 900 to 1400 conventional spray nozzles. More specifically, inlet fogging system 130 may utilize a range of about 80 to 120 EHD nozzles 132 for providing water-spray 144 to reduce a temperature of inlet air that may be drawn into air inlet duct 118. The number of EHD nozzles 132 used in inlet fogging system 130 may be dependent, at least in part on, the size of gas turbine 100, the size of compressor device 102, the size of inlet duct system 114, the air flow rate in gas turbine 100, or the ambient temperature of the air drawn in by air inlet duct 118.

Figure 3:
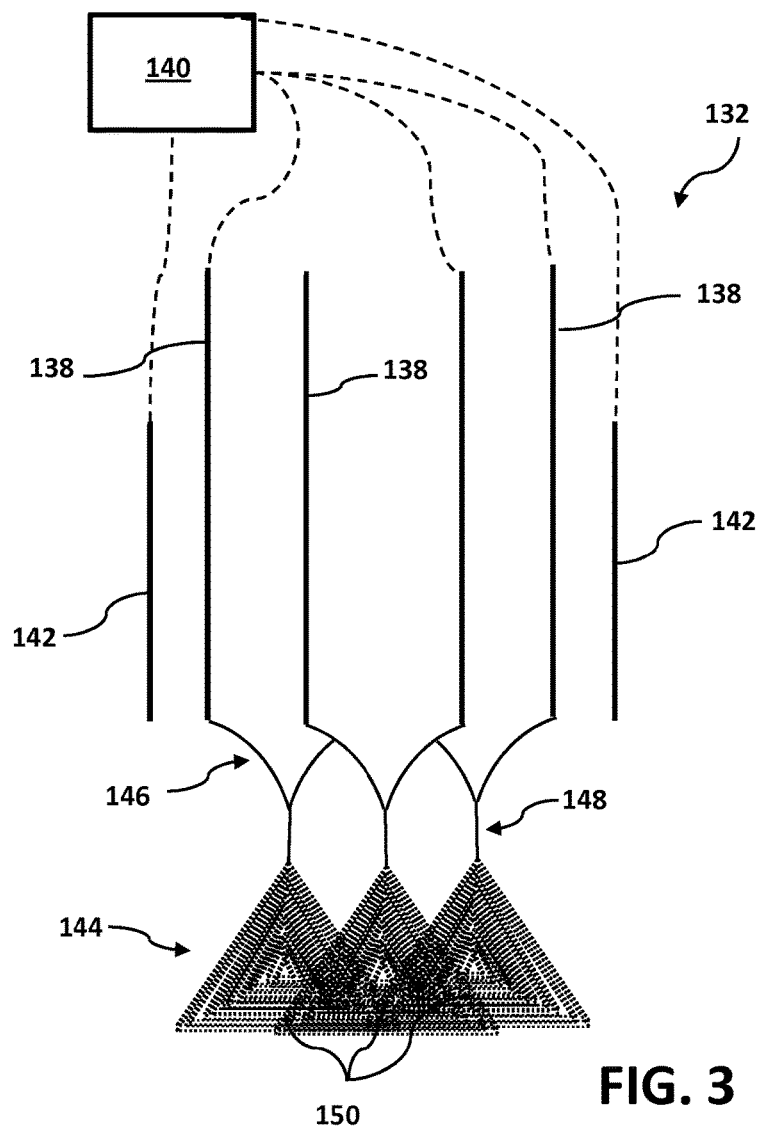
FIG. 3 shows a schematic depiction of a single electrohydrodynamic (EHD) nozzle of the inlet fogging system, according to an alternative embodiment of the invention.

In another embodiment, as best shown in FIG. 3, each EHD nozzle 132 may include a plurality of capillary tubes 138 bundled together and positioned substantially adjacent counter-electric potential 142. More specifically, EHD nozzle 132 may provide a plurality of capillary tubes 138 and each of the plurality of capillary tubes 138 may be connected to an electric potential provided by a power source 140. As discussed above, power source 140 is operably connected to each capillary tube 138 to provide a first voltage to each capillary tube 138. Also as discussed above, power source 140 may be operably connected to counter-electric potential 142, and may be configured to provide a second voltage, distinct from the first voltage, to counter-electric potential structure 142. In the Figures, it is understood that similarly numbered components (e.g., capillary tube 138, power source 140, counter-electric potential 142, etc.) may function in a substantially similar fashion. Redundant explanation of these components has been omitted for clarity. In providing the plurality of capillary tubes 138 for each EHD nozzle 132, and the use of electrohydrodynamic atomization of the water discharged by each EHD nozzle 132, the mass flow rate of the EHD nozzles 132 may be increased. As a result of the increase in the mass flow rate of the water being discharged from EHD nozzle 132, the number of EHD nozzles 132 that may be required in inlet fogging system 130 may be reduced, as discussed above.

Returning to FIG. 1, power source 140 may also provide an electric potential to air duct 120. More specifically, power source 140 may provide air duct 120 with an electric potential so air duct 120 may include a charge similar to the charge of water-spray 144 exiting EHD nozzles 132. As a result of air duct 120 having a charge similar to the charge placed on water-spray 144, unevaporated water-spray 144 of EHD nozzles 132 may be repelled from the walls of air duct 120. Repelling unevaporated water-spray 144 from air duct 120 may prevent water build up on air duct 120, which ultimately may prevent erosion within air duct system 114.

Power source 140 may also provide an electric potential to the tip of an electrode 151. More specifically, power source 140 may provide the tip of electrode 151 with an electric potential, and a resulting charge opposite to the charge of water-spray 144 exiting EHD nozzles 132. By placing a charge on the tip of electrode 151 opposite to the charge of water-spray 144, unevaporated water-spray 144 of EHD nozzles 132 may be attracted to the tip of electrode 151, and may not collect on the walls of air duct 120. Additionally, placing the charge on the tip of electrode 151 may attract the unevaporated water-spray 144 to a desired flow path within air duct system 114. As shown in FIG. 1, the tip of electrode 151 may be positioned substantially in the center of air duct 120, which may allow the unevaporated water-spray 144 to be attracted to the center of air duct 120. As a result, unevaporated water-spray 144 may move with the inlet air toward compressor device 102 and may continue to reduce the temperature of the inlet air as the water-spray 144 evaporates, rather than building up on the walls of air duct 120. In an alternative embodiment, power source 140 may provide an electric potential to a plurality of electrodes 151 included in air duct system 114 for attracting water-spray 144 away from the walls of air duct 120 and/or attracting water-spray 144 along a desired flow path.

As shown in FIG. 1, air duct system 114 may also include a water drain 152 positioned substantially adjacent an opening of compressor device 102. More specifically, water drain 152 may be positioned in series downstream from air inlet duct 118 and immediately upstream from compressor device 102. Water drain 152 may be configured to collect unevaporated water of water-spray 144 provided by EHD nozzles 132 before the unevaporated water may be drawn into compressor device 102 with the inlet air. Unevaporated water may be collected into water drain 152, and may be provided back to water supply 134 for continuous use with inlet fogging system 130. In an alternative embodiment, power source 140 may provide drain 152 with a voltage and accompanying charge. More specifically, power source 140 may provide drain 152 with a charge opposite the charge placed on water-spray 144. As a result, unevaporated water-spray may be attracted to drain 152 and may be provided back to water supply 134, instead of the unevaporated water-spray 144 entering compressor device 102.

As illustrated in FIG. 1, the plurality of EHD nozzles 132 may be positioned proximate air inlet duct 118. More specifically, EHD nozzles 132 may be positioned within air inlet duct 118 and in series downstream from filter housing 122. In an embodiment, as shown best in FIG. 1, EHD nozzles 132 may be located in the air inlet duct 118 using any now known or later developed support structure. More specifically, as shown in FIG. 1, EHD nozzles 132 may be positioned within air inlet duct 118, and may be supported within air inlet duct 118 using a support frame 158 (FIGS. 4 and 5), as discussed below.

Figure 4:
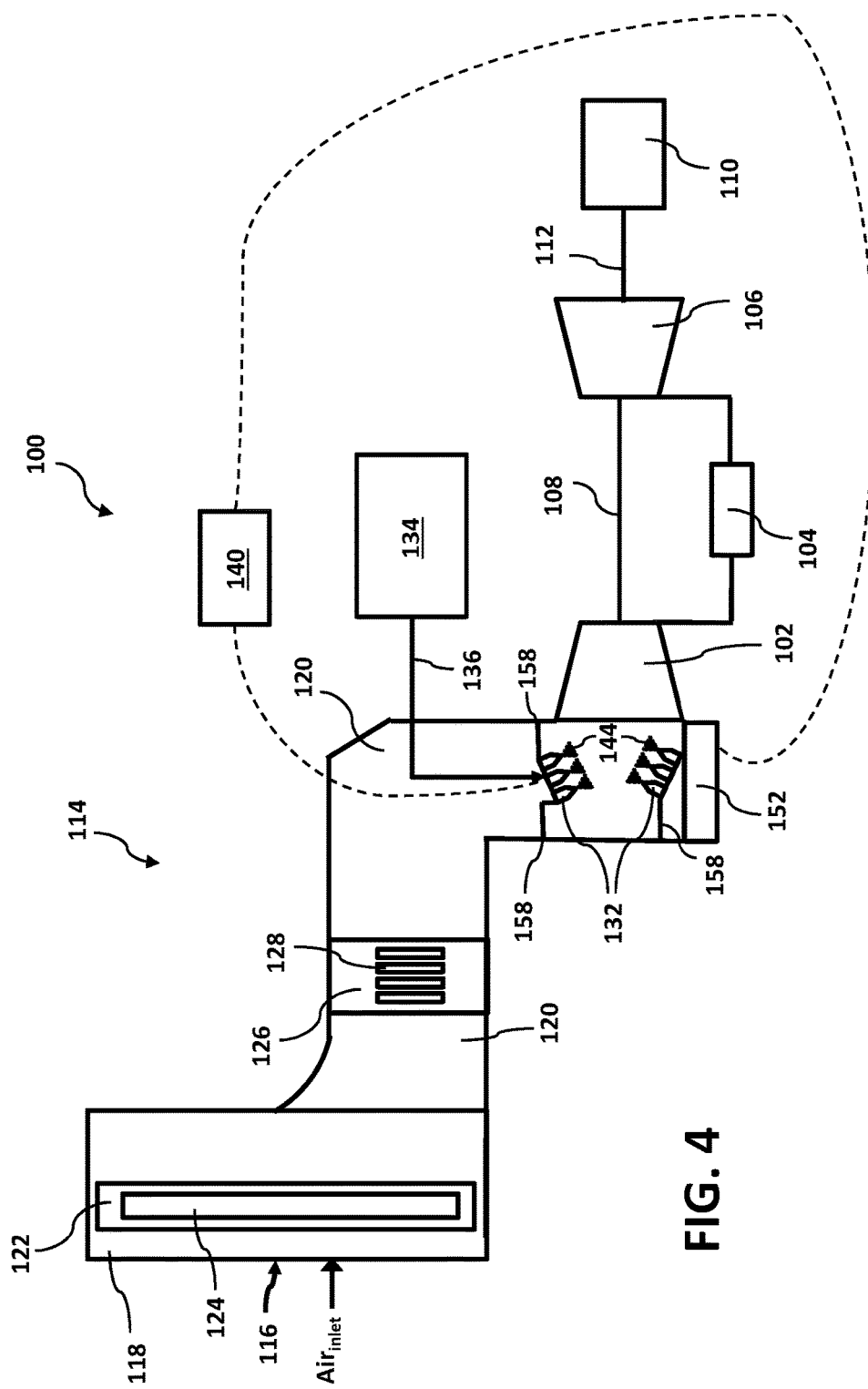
FIG. 4 shows a schematic depiction of a gas turbine system, including an inlet fogging system, according to an alternative embodiment of the invention.
Figure 5:
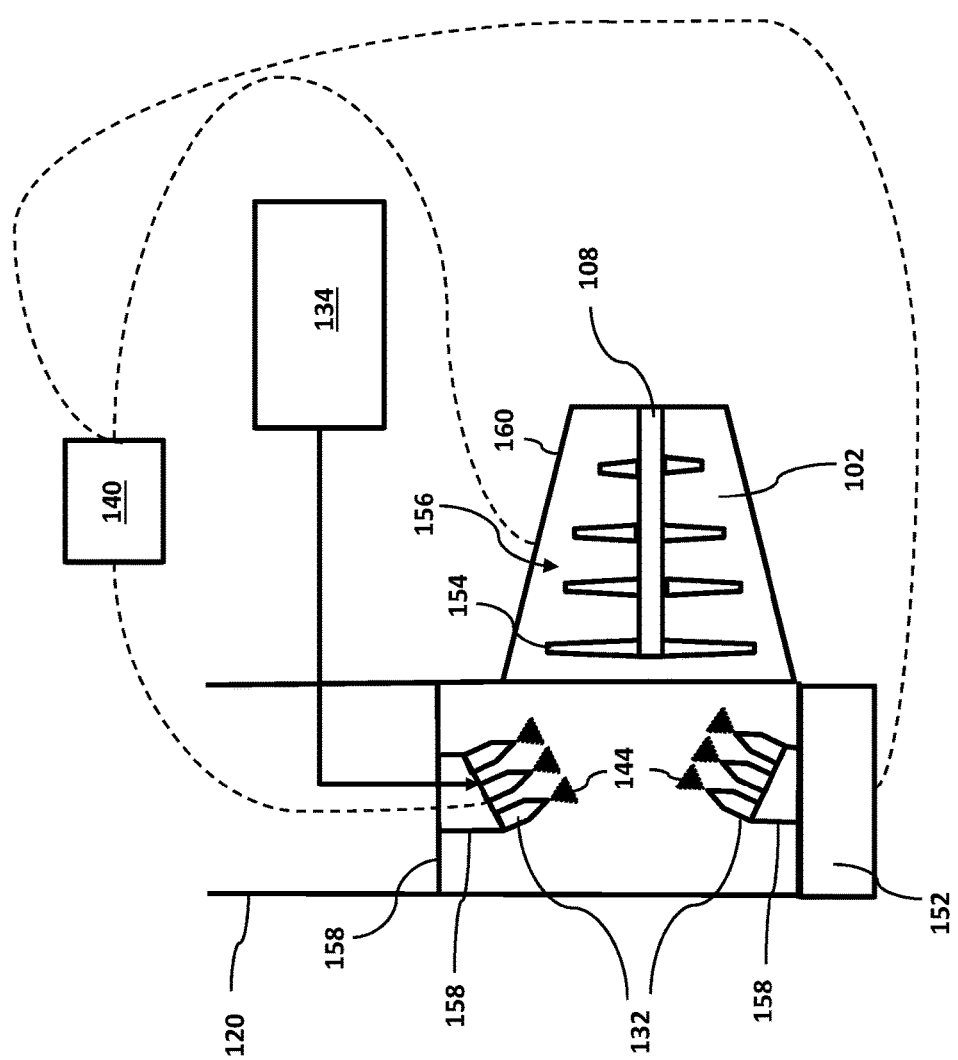
FIG. 5 shows a schematic depiction of an inlet fogging system, including a compressor device of a gas turbine system, according to embodiments of the invention.

Turning to FIG. 4, a schematic depiction of gas turbine 100, including inlet fogging system 130, according to a further alternative embodiment of the invention is disclosed. In a further alternative embodiment, as shown in FIG. 4, the plurality of EHD nozzles 132 may be positioned substantially adjacent to compressor device 102. More specifically, as best shown in FIGS. 4 and 5, EHD nozzles 132 may be positioned in series downstream from air inlet duct 118 and may be positioned substantially adjacent a first set 154 of a plurality of compressor blades 156. As a result of EHD nozzles being positioned substantially adjacent compressor device 102, in an example embodiment, air duct system 114 may be substantially shortened in length. More specifically, filter housing 122, silencer housing 126 and EHD nozzles 132 positioned substantially adjacent compressor device 102 may be positioned in series with one another without the need of excess air ducts 120. As a result, EHD nozzles may be positioned adjacent compressor device 102 and may also be positioned proximate air inlet duct 118. In a further alternative embodiment, as shown in FIGS. 4 and 5, and as discussed above, EHD nozzles 132 may be supported within air duct system 114 by a support frame 158. Support frame 158 may include any conventional support structure (e.g., metal bar frame) configured to support the plurality of EHD nozzles 132 within air duct system 114. As shown in FIG. 5, support frame 158 may be coupled to the walls of air ducts 120 of air duct system 114.

In an embodiment, as shown in FIG. 5, and as previously discussed above with reference air duct 120 depicted in FIG. 1, power source 140 may provide a compressor housing 160 with an electric potential. More specifically, power source 140 may provide compressor housing 160 with an electric potential so compressor housing 160 may include a charge similar to the charge of water-spray 144 exiting EHD nozzles 132. As discussed in detail above, by providing compressor housing 160 with a charge similar to water-spray 144, unevaporated water-spray 144 may be repelled from the walls of compressor housing 160, and may prevent erosion within compressor device 102. Additionally, the similar charge placed on compressor housing 160 may prevent unevaporated water-spray 144 from entering compressor device 102, which may also result in erosion prevention of compressor device 102. In an alternative embodiment, power source 140 may provide an electric potential and charge to at least one of shaft 108 or any of the plurality of compressor blades 156 for preventing unevaporated water-spray from collecting in compressor device 102.

Figure 6:
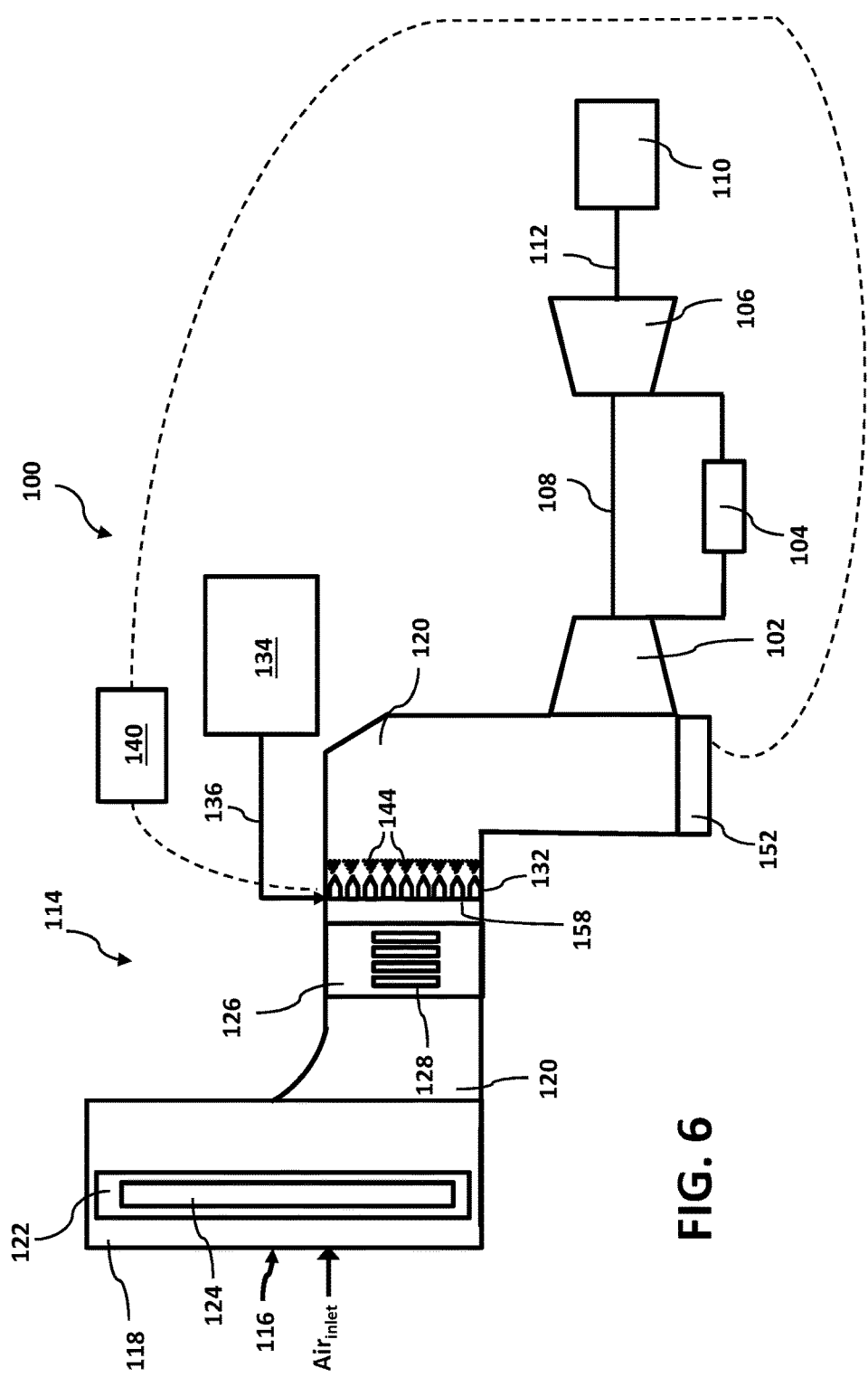
FIG. 6 shows a schematic depiction of a gas turbine system, including an inlet fogging system, according to a further alternative embodiment of the invention.

Turning to FIG. 6, a schematic depiction of gas turbine 100, including inlet fogging system 130, according to an alternative embodiment of the invention is disclosed. In the Figures, it is understood that similarly numbered components (e.g., compressor 102, air inlet duct 118, EHD nozzles 132, power source 140, etc.) may function in a substantially similar fashion. Redundant explanation of these components has been omitted for clarity. In an alternative embodiment, as shown in FIG. 6, the plurality of EHD nozzles 132 may be located downstream of silencer panels 128 of air duct system 114. More specifically, EHD nozzles 132 may be adjacent silencer housing 126 of air duct system 114, and may be positioned in series down stream of air inlet duct 118 and upstream of compressor device 102. As shown in FIG. 6, EHD nozzles 132 may be supported by support structure 158.

As discussed above, inlet fogging system 130 may utilize EHD nozzles 132 and power source 140 for providing evaporative water-spray 144 to inlet air drawn into air duct system 114. That is, inlet fogging system 130 described above is configured to provide water-spray 144 to inlet air so water droplets 150 may evaporate before reaching compressor device 102. In an alternative embodiment, that may have a similar configuration as shown in FIGS. 1 and 2, inlet fogging system 130 may reduce the temperature of inlet air drawn into air duct system 114 using wet compression. In an alternative embodiment utilizing inlet fogging system 130 and EHD nozzles 132 for wet compression, EHD nozzles may provide water-spray 144 for reducing the temperature of inlet air drawn into air duct system 114, such that water-spray 144 may not be completely evaporated before the inlet air reaches compressor device 102. In an alternative embodiment configured to provide wet compression using EHD nozzles 132, inlet fogging system 130 may be configured to provide more water droplets 150, provide more EHD nozzles 132, or any combination thereof. Furthermore, as a result of the diameter of water droplets 150 provided by EHD nozzles 132, water droplets 150 that may reach compressor device 102 may not have a materially degrading effect on the plurality of compressor blades 156 of compressor device 102.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus comprising:
   a gas turbine system including a compressor device;
   an air duct system positioned upstream of the compressor device, the air duct system including:
      an air inlet duct; and
      at least one air duct positioned downstream of and in fluid communication with the air inlet duct, the at least one air duct including:
         an axial section positioned directly adjacent and downstream of the air inlet duct; and
         a radial section positioned between and in fluid communication with the axial section and the compressor device, the radial section formed substantially perpendicular to the axial section;
   a drain positioned upstream and substantially adjacent to the compressor device; and
   a plurality of electrohydrodynamic (EHD) nozzles coupled to a water supply and positioned within the radial section of the at least one air duct, directly adjacent the compressor device, the plurality of EHD nozzles configured to provide an electrically charged water-spray for reducing a temperature of inlet air drawn into the air inlet duct,
   wherein the compressor device has a charge that is identical in polarity as a charge of the electrically charged water-spray and the drain has a charge that is opposite in polarity as the charge of the electrically charged water-spray.

2. The apparatus of claim 1, wherein water droplets of the electrically charged water-spray provided by the plurality of EHD nozzles include a sauter mean diameter (SMD) in a range of about 1 micrometer to about 5 micrometers.

3. The apparatus of claim 1, wherein each of the plurality of EHD nozzles further include:
   at least one capillary tube connected to an electric potential, the at least one capillary tube in fluid communication with the water supply; and
   a counter-electric potential positioned adjacent the at least one capillary tube.

4. The apparatus of claim 3, wherein the at least one capillary tube includes an electrically conductive material.

5. The apparatus of claim 3, further comprising a power source for providing distinct voltages.

6. The apparatus of claim 1, wherein the plurality of EHD nozzles are positioned adjacent a first set of compressor blades of the compressor device of the gas turbine system, the compressor device positioned in series downstream of the air inlet duct.

7. The apparatus of claim 1, wherein the water supply provides water to the plurality of EHD nozzles at a pressure greater than atmospheric pressure.

8. The apparatus of claim 1, wherein the air duct system further includes a wall of silencer panels positioned downstream of the air inlet duct, and within the axial section of the at least one air duct.

9. An air duct system of a gas turbine system, the air duct system comprising:
   an air inlet duct;
   at least one air duct positioned downstream of and in fluid communication with the air inlet duct, the at least one air duct including:
      an axial section positioned directly adjacent and downstream of the air inlet duct; and
      a radial section positioned between and in fluid communication with the axial section and a compressor device of the gas turbine system, the radial section formed substantially perpendicular to the axial section;
   a drain positioned upstream and substantially adjacent to the compressor device of the gas turbine system;
   a plurality of electrohydrodynamic (EHD) nozzles positioned within the radial section of the at least one air duct, directly adjacent the compressor device of the gas turbine system; and
   a water supply in fluid communication with the plurality of EHD nozzles,
   wherein each of the plurality of EHD nozzles are configured to provide an electrically charged water-spray into the radial section of the at least one air duct, the electrically charged water-spray having a charge that is identical in polarity as a charge of the compressor device of the gas turbine system, and opposite in polarity as a charge of the drain.

10. The air duct system of claim 9, wherein the plurality of EHD nozzles are configured to provide the electrically charged water-spray for reducing a temperature of inlet air drawn into the air inlet duct.

11. The air duct system of claim 10, wherein water droplets of the electrically charged water-spray provided by the plurality of EHD nozzles include a sauter mean diameter (SMD) in a range of about 1 micrometers to about 5 micrometers.

12. The air duct system of claim 9, wherein each of the plurality of EHD nozzles further include:
   at least one capillary tube connected to an electric potential, the at least one capillary tube in fluid communication with the water supply; and
   a counter-electric potential positioned adjacent the at least one capillary tube.

13. The air duct system of claim 12, further comprising a power source for providing distinct voltages.

14. The air duct system of claim 12, wherein the at least one capillary tube includes an electrically conductive material.

15. The air duct system of claim 9, wherein the plurality of EHD nozzles are positioned adjacent a first set of compressor blades of the compressor device, the compressor device positioned in series downstream from the air inlet duct.

16. The air duct system of claim 9, further comprising:
   a wall of silencer panels positioned downstream of the air inlet duct, and within the axial section of the at least one air duct.

17. A gas turbine system comprising:
   a compressor device;
   an air duct system positioned upstream of the compressor device, the air duct system including:
      an air inlet duct; and
      at least one air duct positioned downstream of and in fluid communication with the air inlet duct, the at least one air duct including:
         an axial section positioned directly adjacent and downstream of the air inlet duct; and
         a radial section positioned between and in fluid communication with the axial section and the compressor device, the radial section formed substantially perpendicular to the axial section;

a drain positioned upstream and substantially adjacent to the compressor device;

a plurality of electrohydrodynamic (EHD) nozzles positioned within the radial section of the at least one air duct, directly adjacent the compressor device; and a water supply in fluid communication with the each of the plurality of EHD nozzles, wherein each of the plurality of EHD nozzles are configured to provide an electrically charged water-spray into the radial section of the at least one air duct, the electrically charged water-spray having a charge that is identical in polarity as a charge of the compressor device of the gas turbine system, and opposite in polarity as a charge of the drain.

18. The gas turbine system of claim 17, wherein each of the plurality of EHD nozzles include:

at least one capillary tube connected to an electric potential, the at least one capillary tube in fluid communication with the water supply; and a counter-electric potential positioned adjacent the at least one capillary tube.

19. The gas turbine system of claim 18, further comprising:

providing distinct voltages.

20. The gas turbine system of claim 17, wherein the air duct system further includes a wall of silencer panels positioned downstream of the air inlet duct, and within the axial section of the at least one air duct.

* * * * *